United States Patent [19]

Ryan et al.

[11] Patent Number: 5,679,383
[45] Date of Patent: Oct. 21, 1997

[54] DUAL FLEXIBLE LIP EXTRUSION APPARATUS

[75] Inventors: John W. Ryan, Topsfield, Mass.; Vernon J. Krupa, Chippewa Falls, Wis.; Gregory M. Wilson, Eau Claire, Wis.; Donald R. Garton; Harry G. Lippert, both of Chippewa Falls, Wis.

[73] Assignee: Extrusion Dies, Inc., Chippewa Falls, Wis.

[21] Appl. No.: 259,614

[22] Filed: Jun. 14, 1994

Related U.S. Application Data

[63] Continuation-in-part of Ser. No. 192,179, Feb. 4, 1994, abandoned.

[51] Int. Cl.⁶ ............................. B29C 47/12; B29C 47/16
[52] U.S. Cl. .......................... 425/141; 264/40.7; 264/167; 425/465; 425/466
[58] Field of Search ....................... 425/141, 465, 425/466, DIG. 5; 264/167, 40.7, 212; 74/569

[56] References Cited

U.S. PATENT DOCUMENTS

| 1,422,356 | 7/1922 | Heller . | |
|---|---|---|---|
| 3,096,543 | 7/1963 | Konopacke et al. | 425/466 |
| 3,377,655 | 4/1968 | Kucharski et al. | 425/466 |
| 3,830,610 | 8/1974 | Ohkawa et al. | 425/141 |
| 3,940,221 | 2/1976 | Nissel | 425/141 |
| 4,055,389 | 10/1977 | Hayward | 425/466 |
| 4,302,172 | 11/1981 | Hogseth et al. | 425/466 |
| 4,522,678 | 6/1985 | Zieke | 156/501 |
| 4,592,710 | 6/1986 | Reifenhauser et al. | 425/141 |
| 4,594,063 | 6/1986 | Reifenhauser et al. | 425/141 |
| 4,753,587 | 6/1988 | Djordjevic et al. | 425/141 |
| 4,854,844 | 8/1989 | Carlsen | 425/141 |
| 4,978,289 | 12/1990 | Maejima | 425/141 |
| 4,990,079 | 2/1991 | Lorenz | 425/141 |
| 5,020,984 | 6/1991 | Cloeren et al. | 425/141 |
| 5,046,938 | 9/1991 | Hirschberger | 425/141 |
| 5,102,602 | 4/1992 | Ziegler | 425/141 |
| 5,208,047 | 5/1993 | Cloeren et al. | 425/141 |
| 5,253,992 | 10/1993 | Reifenhauser | 425/141 |

FOREIGN PATENT DOCUMENTS

| 0456176 | 11/1991 | European Pat. Off. . |
| 2028228A | 3/1980 | Germany . |

OTHER PUBLICATIONS

Drawing of prior-art die (no month, year).

Primary Examiner—Jan H. Silbaugh
Assistant Examiner—Mark Eashoo
Attorney, Agent, or Firm—Marshall, O'Toole, Gerstein, Murray & Borun

[57] ABSTRACT

An extrusion apparatus includes first and second die body portions each having a main body and a lip interconnected with the main body wherein the die body portions are joined such that a single die outlet is formed between and bounded by the lips. The apparatus also includes suitable structure for moving the lips to adjust the die outlet.

33 Claims, 8 Drawing Sheets

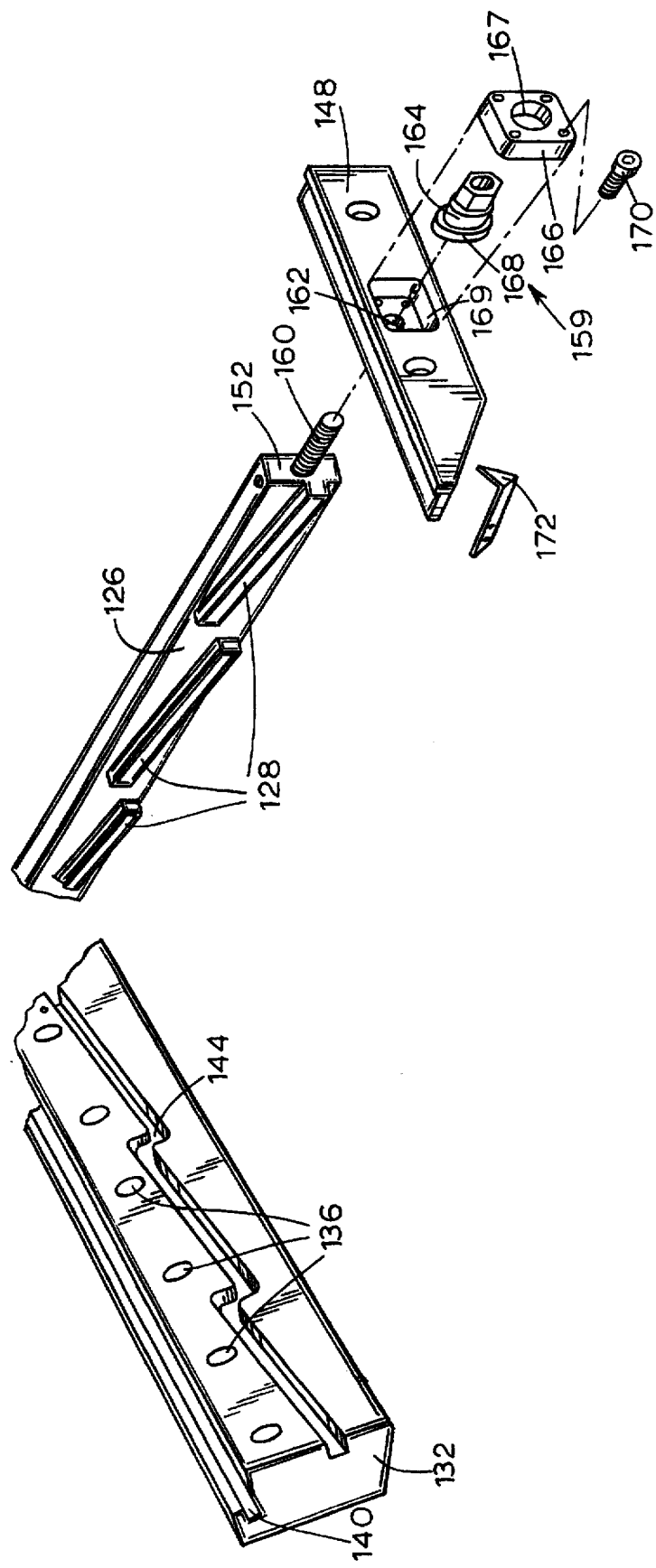

DUAL FLEXIBLE LIP EXTRUSION APPARATUS

CROSS-REFERENCE TO RELATED APPLICATION

This application is a continuation-in-part of application Ser. No. 08/192,179, filed Feb. 4, 1994, now abandoned.

TECHNICAL FIELD

The present invention relates generally to extrusion apparatus and, more particularly, to an apparatus for extruding a stream of thermoplastic material through an outlet defined by a pair of flexible lips.

BACKGROUND ART

Dies for extruding thermoplastic material typically include a pair of die portions joined together to define an outlet through which molten thermoplastic material is extruded. Specifically, each die portion includes a lip, and the lips of the two die portions cooperate to define a die outlet or lip gap.

In one type of prior art extrusion apparatus, the lips are integral with the die portions and a first one of the lips is joined to a respective die portion by a flexible hinge. Apparatus is provided to adjust the position of the first lip and thus the width of the lip gap. Specifically, the adjustment apparatus includes a plurality of thermally responsive members spaced along the width of the die and a plurality of heater elements each disposed in heat-transfer relationship with a thermally responsive member. The heater elements are individually controlled to adjust the profile of the lip gap at one edge thereof. Alternatively, a manually operable adjustment apparatus may be provided to adjust the width of the lip gap. In either case, the adjustability of the die is limited by the deflection limit of the flexible hinge. Also, the initial set-up procedure to preset the desired outlet width can be undesirably time consuming.

In another prior art extrusion die, referred to as a "sliding lip" die, first and second die lip members are separate from and carried by respective die portions. The first die lip member is rigidly secured to the die body while a second die lip member is mounted for sliding movement relative to the first die lip member. Again, adjustment apparatus is provided for positioning the second die lip member so that a desired lip gap width is achieved and maintained. While this die design has a wide adjustment range, changing of the gap width can be a lengthy process and gauge control capability is limited.

A third prior art extrusion die includes first and second die body portions, one having a first lip coupled integrally therewith by a flexible hinge and the other having a second, removable lip bolted thereto. A plurality of thermally responsive members are coupled to the first lip for adjusting the position of that lip to achieve a desired extrudate profile. The removable lip, on the other hand, is stationary but can be replaced by other lip members having different dimensions so that the base lip gap can be selected as desired or necessary. This die has relatively good gauge control compared with other prior art die designs but requires a longer time to change the base lip gap and thus has a longer product changeover time.

Because processors of extruded film, sheet, and coatings often must meet their customers' demands with "just-in-time" deliveries, it is important that the time required to adjust the lip gap dimensions of extrusion dies be kept as short as possible to maximize production of extruded materials and minimize production of scrap material during changeovers. Moreover, because extruded materials are often required in a wide range of thicknesses, it is desirable to provide a single die having a wide adjustment range so that a variety of material thicknesses can be produced without the need to replace the lips or other components of the die and requiring minimal reconfiguration time.

SUMMARY OF THE INVENTION

In accordance with one aspect of the present invention, an extrusion apparatus includes first and second die body portions each having a main body and a lip interconnected with the main body. The die body portions are joined such that a single die outlet is formed between and bounded by the lips, and means are coupled with the die body portions for moving the lips to adjust the die outlet.

Preferably, the first and second moving means independently adjust the lips of the first and second die body portions. Also preferably, the first moving means includes a thermally expandable bolt coupled to one of the lips. Still further, the second moving means preferably includes a lip adjustment block coupled with the other of the lips and positionable to adjust the position of that lip. The lip and the main body of each of the die body portions are preferably integral with one another but alternatively may be coupled to one another by a separate hinge and maintained in a desired relative position.

In accordance with another aspect of the present invention, an extrusion apparatus for extruding a single stream of thermoplastic material includes first and second die body portions each including a main body and a lip interconnected with the main body. The flexible lip is movable relative to the main body, and the main bodies of the first and second die body portions are joined together such that a single die outlet is formed between and bounded by the lips of the die body portions. The apparatus also includes a thermally expandable bolt coupled to one of the lips for moving the lip to permit adjustment of the die outlet and means coupled to the other lip for moving the other lip to permit further adjustment of the die outlet. The lips of the first and second die body portions thereby cooperate to control the thickness of the single stream of thermoplastic material extruded by the apparatus.

In accordance with yet another aspect of the present invention, an extrusion apparatus for extruding a single stream of thermoplastic material includes first and second die body portions each including a main body and a flexible lip interconnected with the main body. The flexible lip is movable relative to the main body, and the first and second die body portions are joined together to form a die outlet bounded on the first and second sides by the lips of the first and second die body portions, respectively. The single stream exits the apparatus through the die outlet in contact with the first and second lips. In addition, moving means are coupled to the lips of the first and second die body portions for moving the flexible lips relative to one another to permit adjustment of the die outlet thereby to control the thickness of the single stream of thermoplastic material extruded by the apparatus.

In one embodiment of the present invention, the moving means for moving one of the flexible lips is disposed only at one end of the die and is adapted to move the one lip bidirectionally. In this embodiment, the above-described moving means includes a lip adjustment block coupled to one of the lips for adjusting the position of the one lip and further includes translating means for translating the lip adjustment block. The translating means includes a sliding angle member having a threaded stud axially extending therefrom and a spool having threads that engage corresponding threads on the stud.

Preferably, the spool is retained on a first end of the die such that rotation of the spool in either of first and second directions causes lateral movement of the sliding angle member in respective third and fourth directions thereby translating the lip adjustment block to adjust, in turn, the position of the one lip bidirectionally.

Also preferably, the translating means includes a spool retainer for retaining the spool on the first end of the die. The die may further include a rail end plate at the first end thereof, and the spool retainer may be secured to the rail end plate. Moreover, the rail end plate may have a cavity formed therein for receiving the spool retainer.

BRIEF DESCRIPTION OF THE DRAWINGS

FIG. 9 comprises a fragmentary exploded isometric view, partly in section and similar to FIG. 6, of the embodiment of FIG. 8.

DESCRIPTION OF THE PREFERRED EMBODIMENTS

Figure 1:
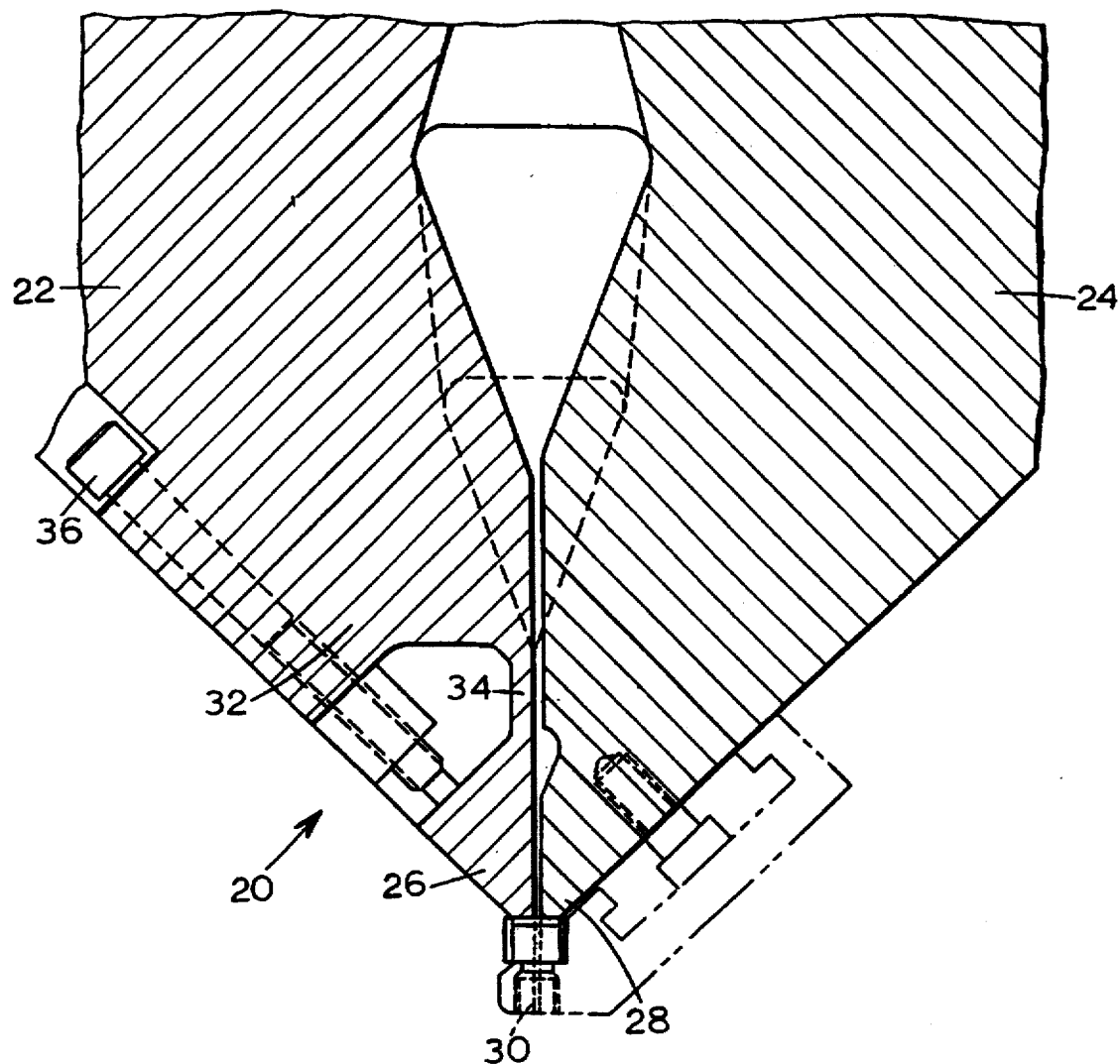
FIG. 1 comprises a sectional view of a prior art extrusion apparatus having a single flexible lip.

Referring initially to FIG. 1, a prior art extrusion die 20 includes first and second die body portions 22, 24 having respective lips 26, 28. The first and second die body portions 22, 24 are joined together in any conventional manner, for example by body bolts (not shown), such that a die outlet 30 is formed between and defined by the lips 26, 28. The lips 26, 28 are integral with the die body portions 22, 24, respectively, and the lip 26 is interconnected with a main body 32 of the die body portion 22 by a hinge 34. A number of thermally expandable bolts 36 are coupled between the main body 32 and the lip 26 of the die body portion 22 for moving the lip 26 relative to the lip 28 to adjust the die outlet 30. A plurality of heaters (not shown) are disposed in heat-transfer relationship with the bolts 36 and are controlled so that the die outlet 30 has a predetermined profile corresponding to the desired dimensions of the material to be extruded. Due to the limited flexibility of the hinge 34, however, this type of die, called a flex-lip die, can produce only a limited range of extrudate thicknesses. Moreover, this design requires a long time to preset the required gap dimensions.

Figure 2:
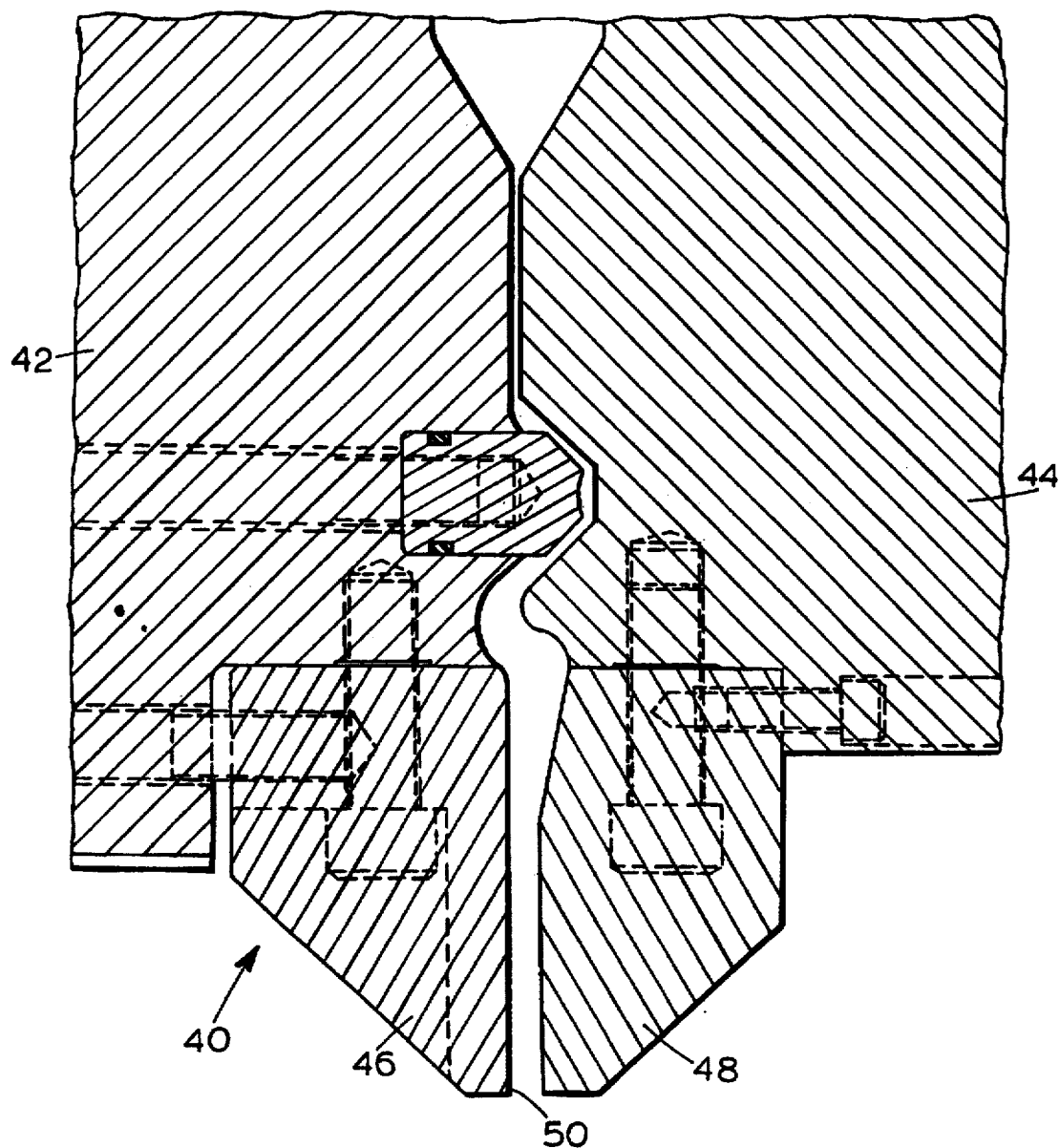
FIG. 2 comprises a sectional view of a prior art extrusion apparatus having a sliding lip.

Referring now to FIG. 2, another prior art extrusion die 40 includes first and second die body portions 42, 44 and lip members 46, 48 coupled to the die body portions 42, 44, respectively. The die body portions 42, 44 are joined such that a die outlet 50 is formed between the lip portions 46, 48. One lip member 46 is capable of sliding in a horizontal direction (as shown in FIG. 2) relative to the other lip member 48, which is bolted in place and thus remains stationary, in order to vary the dimensions of the die outlet 50. While this so-called sliding lip die has a wider operating range than the flex-lip die of FIG. 1, the sliding lip die requires a long time to change the dimensions of the die outlet 50. Moreover, this is a cumbersome die design that offers little flexibility and only limited gauge control capability.

Figure 3:
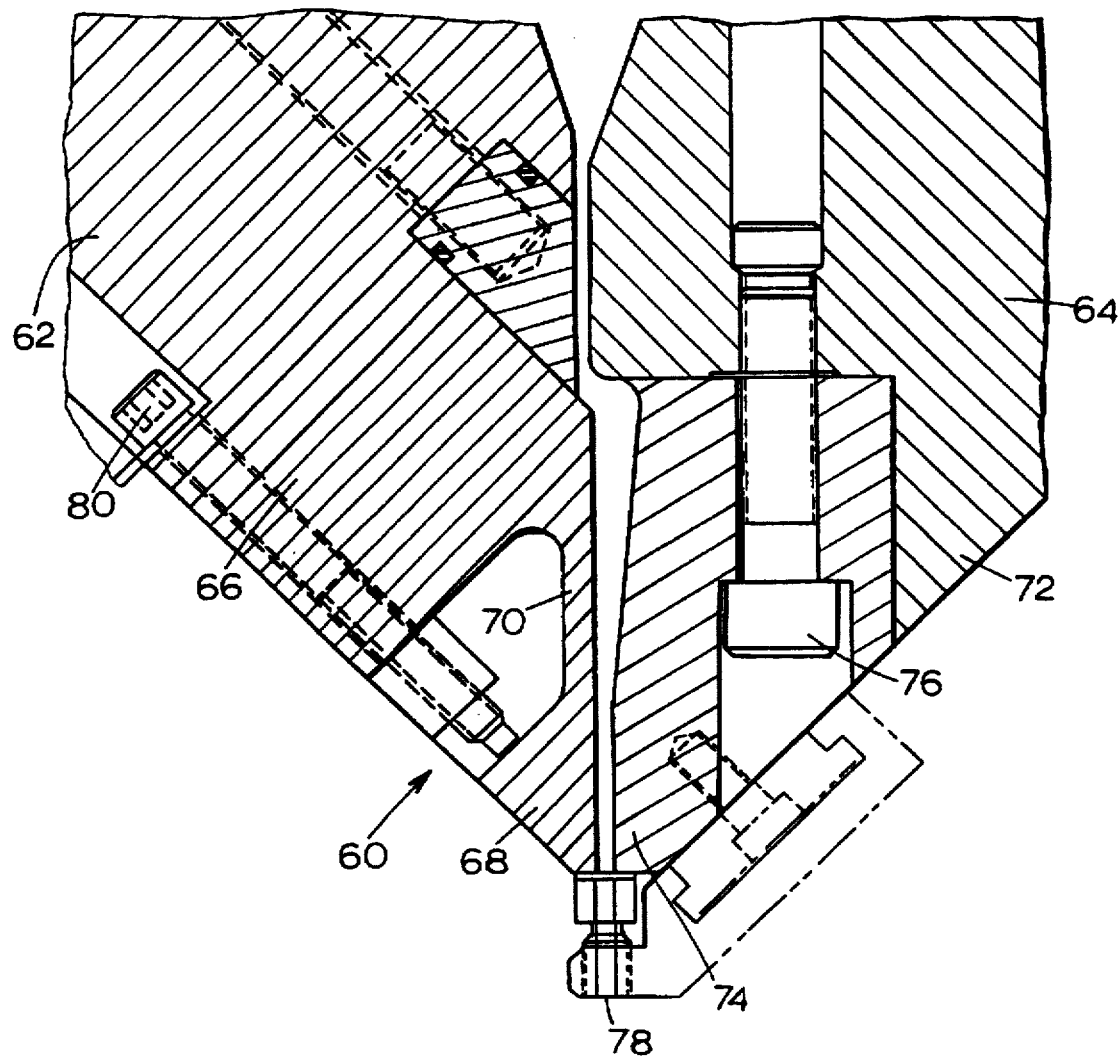
FIG. 3 comprises a sectional view of a prior art extrusion apparatus having a flexible first lip and a removable second lip.

Referring now to FIG. 3, a third prior art extrusion apparatus 60 includes first and second die body portions 62, 64. The die body portion 62 includes a main body 66, a lip 68, and a hinge 70 interconnecting the main body 66 and the lip 68. The die body portion 64 includes a main body 72 and a lip member 74 secured to the main body 72 by a plurality of bolts 76 (only one of which is shown in FIG. 3). The die body portions 62, 64 are joined such that a die outlet 78 is formed between and defined by the lip 68 and the lip member 74. Thermally expandable bolts 80 coupled between the main body 66 and the lip 68 are operable to move the lip 68 to adjust the die outlet 78. In addition, the lip member 74 may be removed from the main body 72 of the die body portion 64 by unscrewing bolts 76, one of which is shown in FIG. 3. A different lip member 74 may be attached to the main body 72 by the bolts 76 so that a different configuration or lip gap for the die outlet 78 is obtained.

Figure 4:
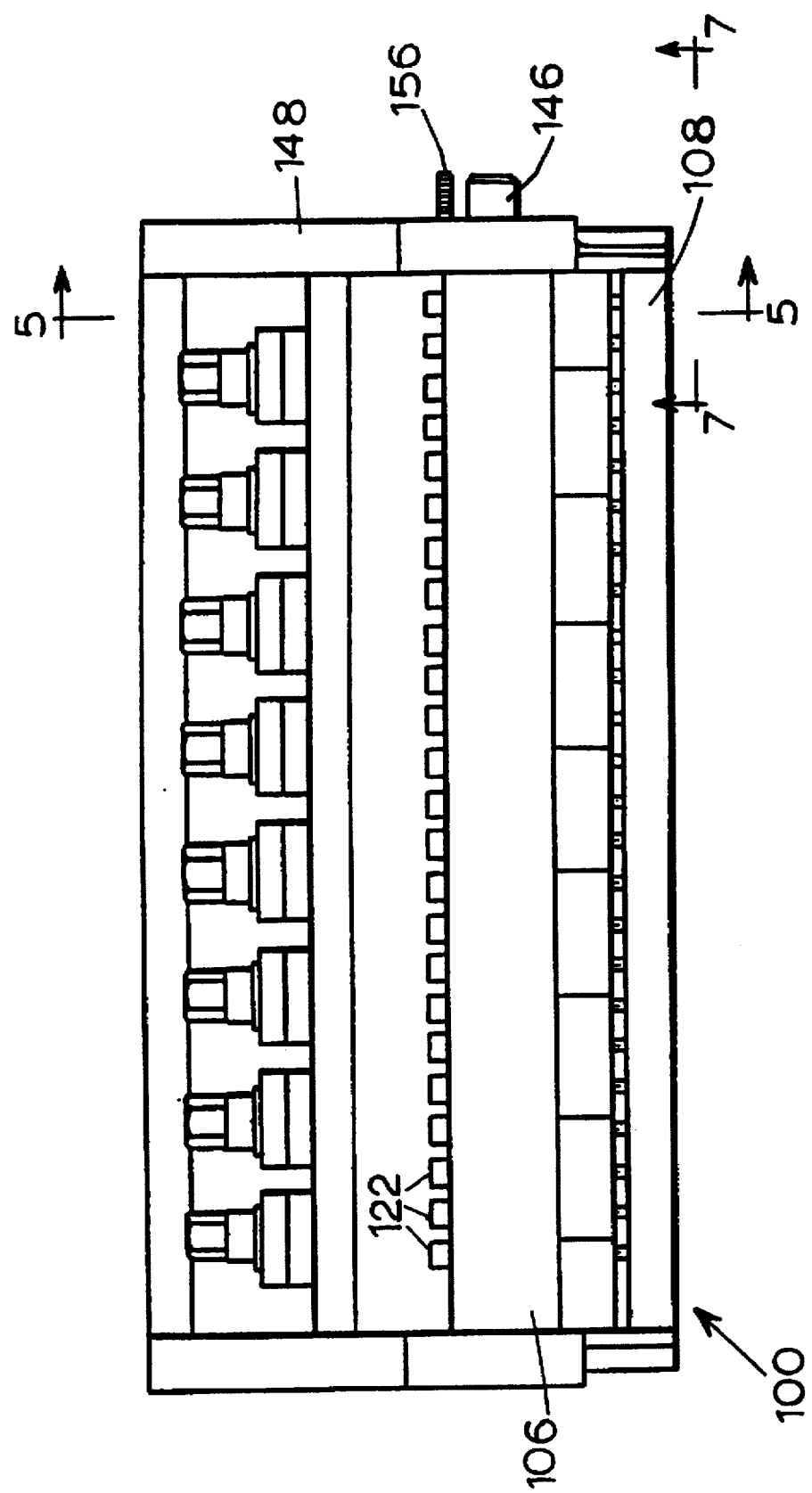
FIG. 4 comprises a perspective of an extrusion apparatus according to the present invention.
Figure 5:
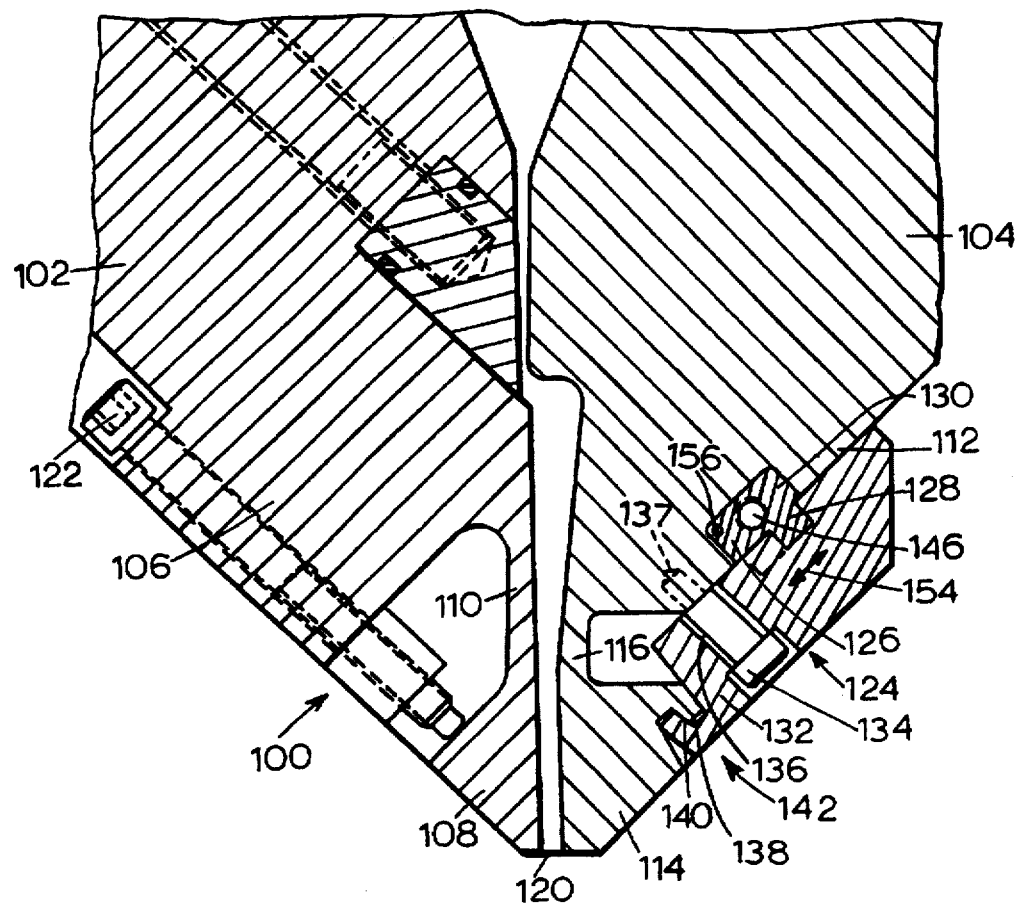
FIG. 5 comprises a sectional view of the extrusion apparatus of the present invention taken generally along the lines 5—5 of FIG. 4.

Referring now to FIGS. 4 and 5, an extrusion apparatus 100 in accordance with the present invention includes first and second die body portions 102, 104. The die body portion 102 includes a main body 106, a lip 108, and a hinge 110 interconnecting the lip 108 with the main body 106. Similarly, the die body portion 104 includes a main body 112, a lip 114, and a hinge 116 interconnecting the lip 114 with the main body 112. The die body portions 102, 104 are joined by body bolts (not shown) such that a single die outlet 120 is formed between and bounded by the lips 108, 114. Mechanically adjustable bolts 122 are coupled between the main body 106 and the lip 108 for moving the lip 108 bidirectionally to precisely adjust the dimensions of the die outlet 120. Alternatively, the bolts 122 may be thermally expandable and a series of heaters (not shown) may be automatically controlled to adjust the dimensions of the die outlet 120 as disclosed in Nissel U.S. Pat. No. 3,940,221, the disclosure of which is hereby incorporated herein by reference.

Figure 7:
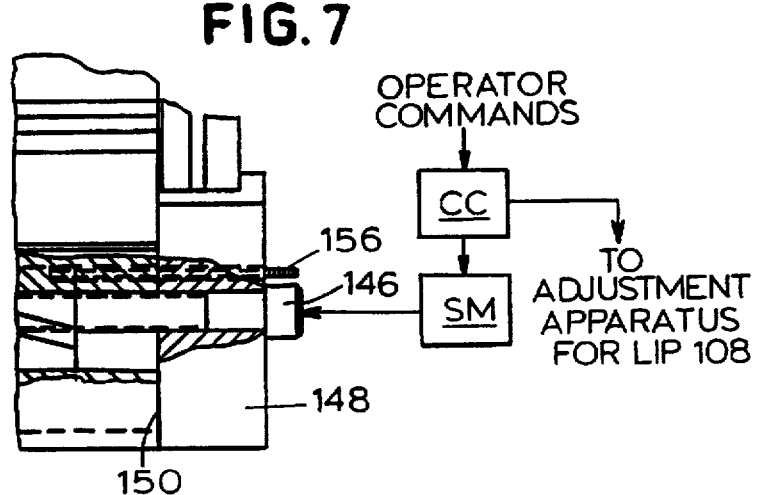
FIG. 7 comprises a fragmentary elevational view, partly in section and taken generally along the lines 7—7 of FIG. 4, of a portion of the extrusion apparatus of FIG. 4.
Figure 6:
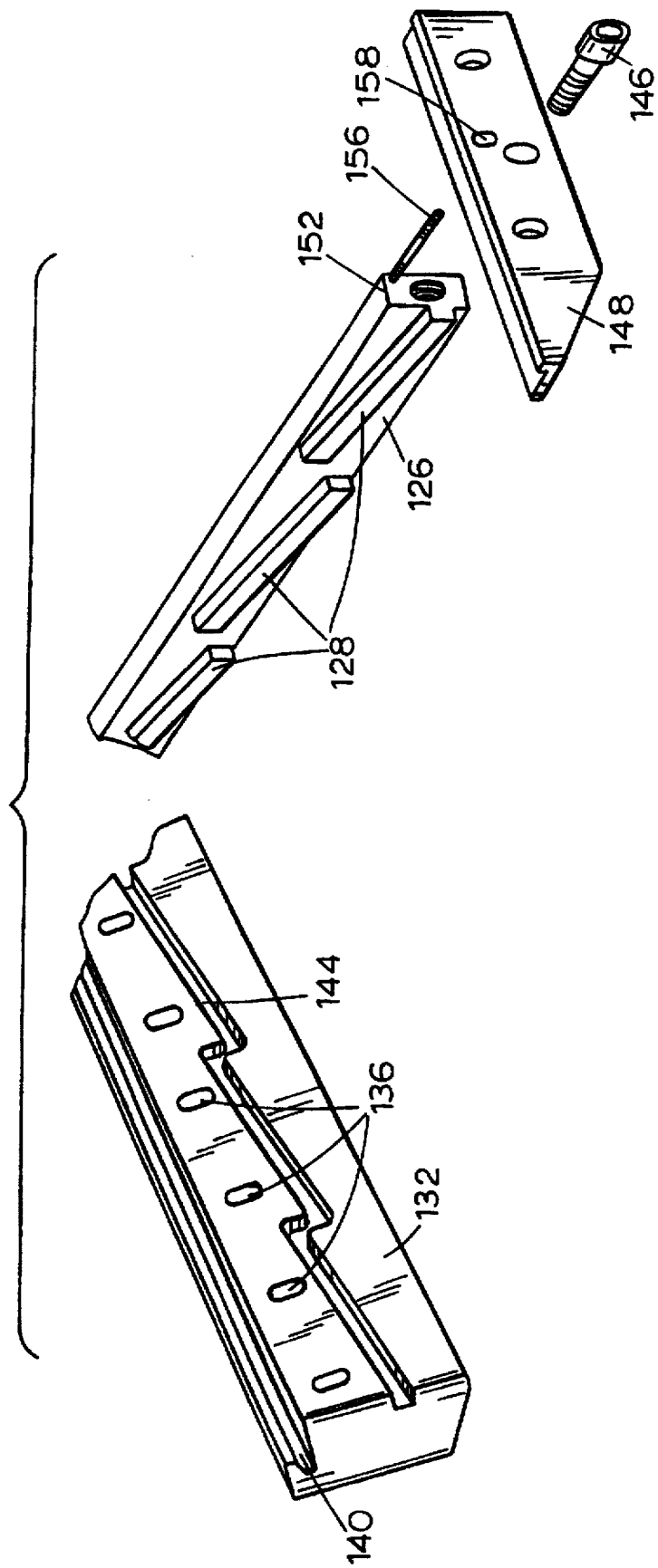
FIG. 6 comprises a fragmentary exploded isometric view of a portion of the extrusion apparatus of FIG. 4.

Referring also to FIGS. 6 and 7, apparatus 124 is provided for moving the lip 114 to further adjust the die outlet 120. Specifically, a sliding angle member 126 having one or more angled cam blocks 128 extending therefrom is disposed closely within a longitudinally extending recess 130 in the die body portion 112. A lip adjustment block 132 is adjustably secured by a series of shouldered bolts 134 (one of which is shown in FIG. 5) to the main body 112. More specifically, each shouldered bolt 134 is disposed in an elongated slot 136 in the lip adjustment block 132 and is threaded into a corresponding bore 137 in the main body 112. Each slot 136 is sized relative to the bolt 134 located therein such that the shouldered bolts 134 hold the block 132 against the main body 112, and the block 132 is movable up and down but not in and out (as shown in FIG. 5). Thus, the block 132 may be located in any desired position relative to the main body 112. A flange 138 carried by the lip 114 extends the full width of the die body portion 104 and is snugly disposed in a complementarily shaped groove or recess 140 formed in a marginal portion 142 extending the full width of the lip adjustment block 132. It should be noted that the flange 138 and the complementary groove 140 need not extend along the full width of the die body portion 104 as shown in FIG. 7 and that the lip adjustment block 132 may, in fact, be coupled to the lip 114 in any conventional manner known to those of ordinary skill in the art. The lip adjustment block 132 is provided with one or more slots or recesses 144 which are sized to closely receive the cam blocks 128 for sliding movement therein. A pull screw 146 extends through a rail end plate 148 mounted on the end 150 of the die 100 and is threaded into one end 152 of the sliding angle member 126.

During operation, the sliding angle member 126 is moved longitudinally within the recess 130 by turning the pull screw 146. As the sliding angle member 126 moves laterally along the width of the extrusion apparatus 100, the cam blocks 128 are carried therewith and, in turn, engage the walls defining the recesses 144. This movement causes the lip adjustment block 132 to move in a direction shown by the arrow 154 of FIG. 5, i.e., perpendicular to the lateral movement of the sliding angle member 126. By keeping tight clearances between the various parts, precise movement of the lip 114 can be obtained, and the lip 114 can be secured in the desired position. Simultaneously, lip heaters (not shown) in thermal contact with the bolts 122 may be controlled so that the dimensions of the die outlet 120 can be precisely adjusted.

An indicator pin 156 extends from the end 152 of the sliding angle member 126 and projects through a hole 158 in the rail end plate 148. The indicator pin 156 may be marked with a scale indicating the position of the lip 114.

As should be evident from the foregoing, by making a simple, single-point adjustment (i.e., turning the pull screw 146), the entire lip 114 may be moved to adjust the lip gap 120. Further, by initially setting the position of the lip 114 at a mid-range position, a total travel range for the lip 114 of 0.200 inches (i.e., ±0.100 inches from the mid-range position) can be achieved. Thus, the die outlet 120 can be preset to a wide range of gap widths in a relatively short period of time as compared with the prior art die designs described above.

It should also be noted that instead of providing the disclosed manual or automatic adjustment of the lip 108, an alternative adjustment apparatus or any other moving means may be provided, as desired. In fact, the adjustment apparatus could be identical to that used to move the lip 114 as described herein. Alternatively, as seen in FIG. 7, one or more servomotors SM may be employed conjunction with a computer control CC to automatically adjust the positions of one or both lips 108, 114 in response to commands issued by an operator of the die 100, if desired.

In addition, it should be noted that the lips 108, 114 may be separate from the main body portions and may be secured to the main body portions by means other than integral hinges.

Figure 8:
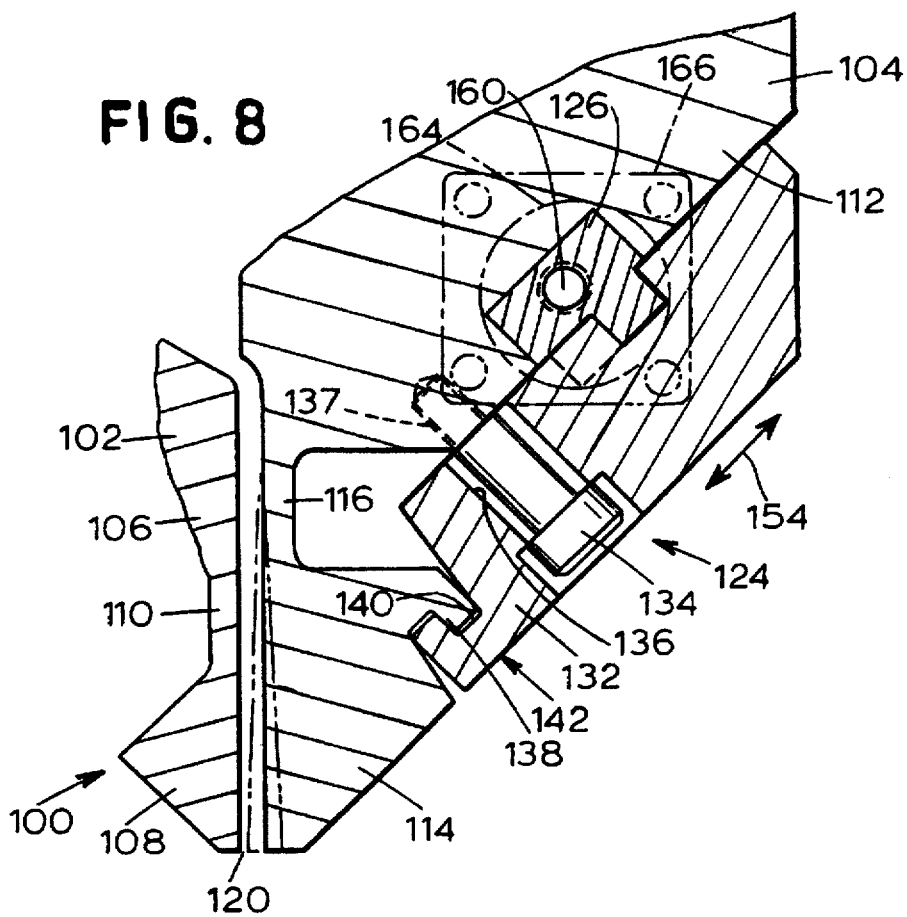
FIG. 8 comprises a fragmentary sectional view, similar to FIG. 5, of a alternative embodiment of an extrusion apparatus according to the present invention.
Figure 10:
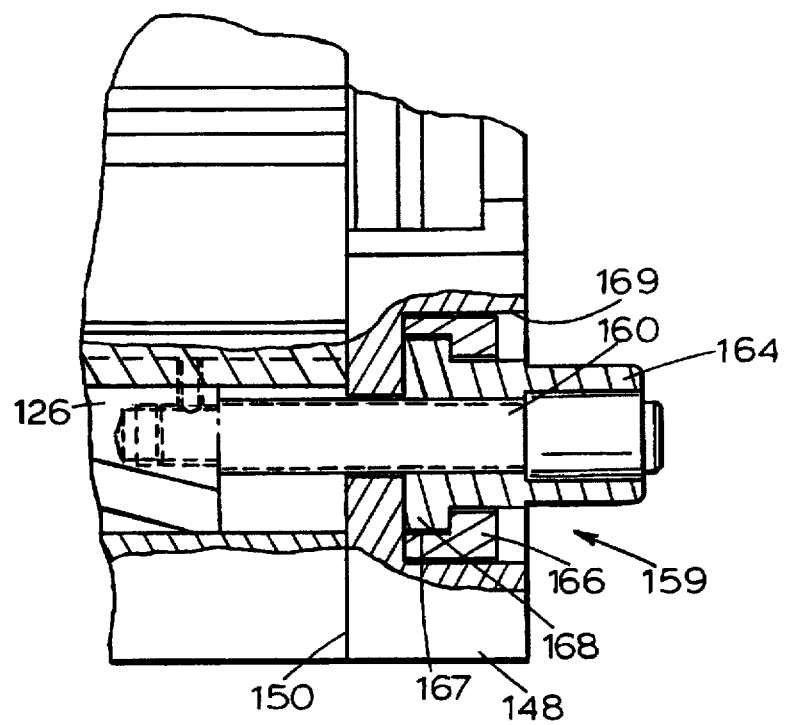
FIG. 10 comprises a fragmentary elevational view, partly in section and similar to FIG. 7, of the embodiment of FIG. 8.

An alternative embodiment of the lip adjustment apparatus is shown in FIGS. 8–10, in which elements that are also present in the embodiment of FIGS. 5–7 are assigned the same reference numerals. In this embodiment, means 159 are provided at the end 150 of the die 100 for moving the lip 114 bidirectionally.

The structure and operation of the lip adjustment block 132 and the sliding angle member 126 are the same in the alternative embodiment as in the embodiment described above. However, the pull screw 146 is replaced with a threaded stud 160 extending axially from one end of the sliding angle member 126 through a hole 162 formed in the rail end plate 148 and is received by a complementarily threaded spool 164. A spool retainer 166 is adapted for retaining the spool 164 to the rail end plate 148. The spool retainer 166 has a counterbore 167 that receives a complimentary flange 168 of the spool 164. Optionally, a cavity 169 may be formed in the rail end plate 148, the cavity 169 being so sized and shaped that the spool retainer 166 may be received within the cavity 169. The spool retainer 166 is bolted to the rail end plate 148, within the cavity 166 (if present), with a plurality of bolts 170.

Referring now to FIG. 8, the operation of the alternative embodiment of the lip adjustment apparatus will now be described. The spool 164 may be rotated in either of first and second directions, i.e., clockwise and counter-clockwise, thereby causing the sliding angle member 126 to move laterally in respective third and fourth directions, i.e., into and out of the page as shown in FIG. 8. Consequently, the lip adjustment block 132, and thus the lip 114, are moved bidirectionally in response to rotation of the spool 164.

An indicator 172 may be fastened to the lip adjustment block 132 to indicate the position of the lip 114. Of course, an alternative indicator, such as the indicator pin 156 of the first embodiment described above and shown in FIGS. 4–7, may be used instead of the indicator 172. Further, the indicator 172, or any other suitable indicator, could replace the indicator pin 156 and the hole 158 in the embodiment of FIGS. 4–7.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. An extrusion die, comprising:
    first and second die body portions each associated with and having a single, lip and a main body and wherein one of the lips extends across a full width of the die body portion associated therewith and is moveable toward and away from the other lip about a hinge portion coupled to a main body and wherein the die body portions are joined such that a single die outlet is formed between and bounded by the lips; and
    moving means coupled to the one lip for moving the one lip across the full width of the die body portion including a lip adjustment block coupled to the one lip and moveable therewith and a sliding member engaged with the lip adjustment block and movable along a linear path to cause the lip adjustment block to move in a second path transverse to the linear path.

2. The extrusion die of claim 1, including further means for moving the other lip independently of the one lip.

3. The extrusion die of claim 2, wherein the further moving means includes a thermally expandable bolt coupled to the other lip.

4. The extrusion die of claim 2, wherein the further moving means includes a mechanically adjustable bolt coupled to the other lip.

5. The extrusion die of claim 1, wherein the one lip includes a flange and the lip adjustment block includes walls defining a groove at a marginal portion of the lip adjustment block and wherein the flange is disposed in the groove and is moveable with the lip adjustment block.

6. The extrusion die of claim 1, wherein a pull screw is disposed in threaded engagement with the sliding member and is rotatable to move the sliding member along the first linear path to thereby move the one lip bidirectionally toward and away from the other lip.

7. The extrusion die of claim 1, wherein a threaded stud extends axially from the sliding member and a spool is disposed in threaded engagement with the threaded stud.

8. The extrusion die of claim 7, wherein the spool is retained at a first end of the die such that rotation of the spool in either of first and second rotational directions causes movement of the sliding member along the first linear path, thereby moving the lip adjustment block along the second path to adjust, in turn, the position of the one lip bidirectionally toward and away from the other lip.

9. The extrusion die of claim 1, further including single-point-adjustment means for adjusting the position of the sliding member along the first linear path.

10. The extrusion die of claim 7, further including a spool retainer for retaining the spool at the first end of the die.

11. The extrusion die of claim 10, further including a rail end plate proximate the first end of the die wherein the spool retainer is secured to the rail end plate.

12. The extrusion die of claim 11, wherein the rail end plate has a cavity therein for receiving the spool retainer.

13. The extrusion die of claim 1, wherein the hinge portion is integral with the one lip and the main body associated with the one lip.

14. The extrusion die of claim 1, wherein the sliding member includes at least one cam block and the lip adjustment block includes walls defining at least one recess sized to closely receive the cam block for sliding movement therein, and wherein the cam block engages the walls defining the recess.

15. The extrusion die of claim 1, wherein the moving means includes a computer control for controlling the movement of one lip.

16. The extrusion die of claim 15, wherein the computer control is also operative to move the other lip independently of the one lip.

17. An extrusion apparatus for extruding a single stream of thermoplastic material, comprising:
    first and second die body portions each of a particular width and including a main body, a single lip having a lip width extending across the entire particular width of an associated die body portion, and a hinge interconnecting the lip and the main body wherein the hinge permits movement of the lip relative to the main body and wherein the first and second die body portions are joined together to form a die outlet bounded on first and second sides by the lips of the first and second die body portions, respectively, whereby the single stream exits the apparatus through the die outlet in contact with the lips; and
    first means coupled to the lips of the first and second die body portions for moving the lips relative to one another to permit adjustment of the die outlet and thereby control the thickness of the single stream of thermoplastic material;
    wherein the first moving means comprises lip adjustment apparatus coupled to one of the lips, a sliding member disposed in sliding engagement with the lip adjustment apparatus and second means for moving the sliding member along the width of the one lip to move the lip adjustment apparatus and thereby adjust the position of the entire one lp.

18. The extrusion apparatus of claim 17, wherein the second moving means includes a threaded stud extending axially from the sliding member and a complementarily threaded spool threadedly engaging the threaded stud.

19. The extrusion apparatus of claim 18, further including means for securing the spool to a first end of the extrusion apparatus such that rotation of the spool in either of clockwise and counterclockwise rotational directions causes lateral movement of the sliding member thereby moving the lip adjustment apparatus to adjust, in turn, the position of the one lip bidirectionally toward and away from the other lip.

20. The extrusion apparatus of claim 19, wherein the securing means comprises a spool retainer for retaining the spool at a first end of the extrusion apparatus.

21. The extrusion apparatus of claim 20, further including a rail end plate disposed proximate the first end of the extrusion apparatus and wherein the spool retainer is secured to the rail end plate.

22. The extrusion apparatus of claim 17, wherein the sliding member includes at least one cam block and the lip adjustment apparatus comprises a block including walls defining at least one recess sized to closely receive the cam block for sliding movement therein, and wherein the cam block engages the walls defining the recess.

23. The extrusion apparatus of claim 17, wherein the moving means further includes means coupled to the other lip for moving the other lip relative to the one lip to permit further adjustment of the die outlet.

24. The extrusion apparatus of claim 17, wherein the first moving means includes a computer control responsive to a command.

25. The extrusion apparatus of claim 24, wherein the second moving means includes a servomotor coupled between the computer control and the one lip.

26. An extrusion apparatus for extruding a single stream of thermoplastic material, comprising:
    first and second die body portions each of a particular width and including a main body, a lip having a width extending entirely across the particular width of an associated die body portion, and a hinge interconnecting the lip and the main body wherein the hinge permits movement of the lip relative to the main body and wherein the first and second die body portions are joined together to form a die outlet bounded on first and second sides by the lips of the first and second die body portions, respectively, whereby the single stream exits the apparatus through the die outlet in contact with the first and second lips; and
    moving means coupled to the lips of the first and second die body portions for moving the lips relative to one another to permit adjustment of the die outlet and thereby control the thickness of the single stream of thermoplastic material;
    the moving means including a lip adjustment block coupled to one of the lips for adjusting the position of the one lip uniformly along a full width of the one lip and further including means for translating the lip adjustment block;
    the translating means including a sliding member having a threaded stud axially extending therefrom and a spool threadedly engaging the stud wherein the spool is retained at one end of the extrusion apparatus such that rotation of the spool in either of clockwise and counterclockwise rotational directions causes lateral movement of the sliding member along the width of the one lip, thereby translating the lip adjustment block to adjust, in turn, the position of the one lip bidirectionally toward and away from the other lip.

27. The extrusion apparatus of claim 26, wherein the moving means includes a computer control.

28. The extrusion apparatus of claim 27, wherein the moving means further includes a servomotor coupled between the computer control and the spool.

29. An extrusion die, comprising:

first and second die body portions each having a single lip and an associated main body and wherein one of the lips is moveable toward and away from the other lip about a hinge portion coupled to the main body associated with the one lip and wherein the die body portions are joined such that a die outlet is formed between and is coextensive with the lips; and means for automatically moving both lips to adjust the die outlet including a computer control responsive to a command and further including at least one member coupled to one of the lips, a sliding member engaged with the at least one member and adjustment apparatus operable to move the sliding member and the at least one member to adjust the position of the one lip along a full width thereof.

30. The extrusion die of claim 29, wherein the adjustment apparatus includes a servomotor coupled between the computer control and the sliding member.

31. The extrusion die of claim 29, wherein the moving means further includes thermal lip adjustment apparatus responsive to the computer control and coupled to the other lip.

32. An extrusion die, comprising:

a pair of main body portions each including a single movable lip wherein the main body portions are joined together such that a single die exit is formed between the movable lips and wherein each lip has a width extending entirely across the die exit; and lip moving apparatus including at least one member coupled to one of the lips, a sliding member engaged with the at least one member and adjustment apparatus operable to move the sliding member and the at least one member to adjust the position of the one lip along a full width thereof, wherein the adjustment apparatus includes a rotatable member engaged with the sliding member and wherein, by rotating the rotatable member, the sliding member moves along a first direction and the at least one member moves along a second direction transverse to the first direction.

33. The extrusion die of claim 32, wherein the lip moving apparatus adjusts the position of the one lip uniformly across the die exit.

* * * * *

UNITED STATES PATENT AND TRADEMARK OFFICE
CERTIFICATE OF CORRECTION

PATENT NO. : B1 5,679,383

DATED : January 5, 1999

INVENTOR(S) : Ryan et al.

It is certified that error appears in the above-identified patent and that said Letters Patent is hereby corrected as shown below:

At column 3, line 27, change "threaded" to - -threadedly- -.

At column 3, line 55, delete "adjustment" (second occurrence) and insert - -adjust- -.

At column 4, line 27, after "the" (first occurrence), insert - -one- -.

Signed and Sealed this

Twenty-ninth Day of May, 2001

Attest:

NICHOLAS P. GODICI

Attesting Officer

Acting Director of the United States Patent and Trademark Office

REEXAMINATION CERTIFICATE (3702nd)

United States Patent [19]

Ryan et al.

[11] B1 5,679,383

[45] Certificate Issued Jan. 5, 1999

[54] DUAL FLEXIBLE LIP EXTRUSION APPARATUS

[75] Inventors: John W. Ryan, Topsfield, Mass.; Vernon J. Krupa, Chippewa Falls, Wis.; Gregory M. Wilson, Eau Claire, Wis.; Donald R. Garton; Harry G. Lippert, both of Chippewa Falls, Wis.

[73] Assignee: Extrusion Dies, Inc., Chippewa Falls, Wis.

Reexamination Request:
No. 90/004,880, Dec. 23, 1997

Reexamination Certificate for:
Patent No.: 5,679,383
Issued: Oct. 21, 1997
Appl. No.: 259,614
Filed: Jun. 14, 1994

Related U.S. Application Data

[63] Continuation-in-part of Ser. No. 192,179, Feb. 4, 1994, abandoned.

[51] Int. Cl.[6] .................. B29C 47/12; B29C 47/16
[52] U.S. Cl. ............... 425/141; 264/40.7; 264/167; 425/465; 425/466
[58] Field of Search ................................ 425/141, 465, 425/466, DIG. 5; 264/167, 40.7, 212; 74/569

[56] References Cited

U.S. PATENT DOCUMENTS

| | | |
|---|---|---|
| 2,938,231 | 5/1960 | Lowey, Jr. . |
| 3,264,686 | 8/1966 | Soloduk . |
| 3,859,032 | 1/1975 | Krupa . |
| 4,454,084 | 6/1984 | Smith et al. . |
| 4,592,710 | 6/1986 | Reifenhauser et al. . |
| 4,753,587 | 6/1988 | Djordjevic et al. . |
| 5,067,432 | 11/1991 | Lippert . |

OTHER PUBLICATIONS

Extrusion Dies, Inc. Sales Literature (Sliding Wedge), 1992.
Extrusion Dies, Inc. Drawings & Written Description, 1989.
European Search Report dated May 19, 1995 (2 pages)—Application No. 94112554.4.
European Examination Report dated Jun. 10, 1997 (6 pages)—Application No. 94112554.4.

*Primary Examiner*—Jan H. Silbaugh
*Attorney, Agent, or Firm*—William E. McCracken; Marshall, O'Toole, Gerstein et al.

[57] ABSTRACT

An extrusion apparatus includes first and second die body portions each having a main body and a lip interconnected with the main body wherein the die body portions are joined such that a single die outlet is formed between and bounded by the lips. The apparatus also includes suitable structure for moving the lips to adjust the die outlet.

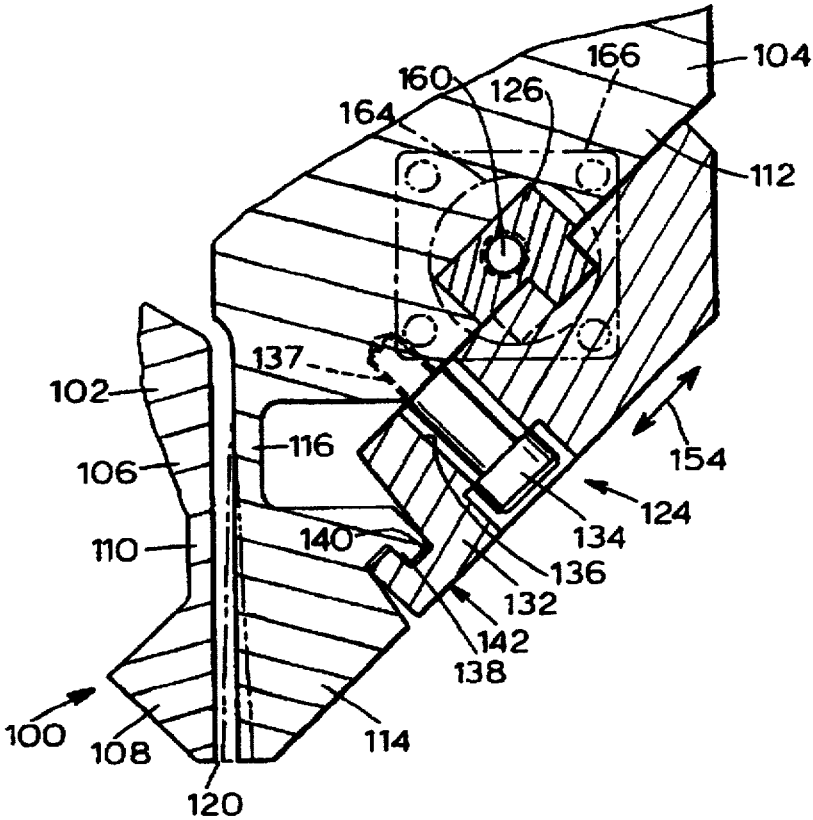

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REXAMINATION, IT HAS BEEN DETERMINED THAT:

The patentability of claims 26, 27 and 28 is confirmed.

Claims 1, 5, 7, 14, 17, 18, 22, 23, 25, 29 and 32 are determined to be patentable as amended.

Claims 2–4, 6, 8–13, 15, 16, 19–21, 24, 30–31 and 33 dependent on an amended claim, are determined to be patentable.

1. An extrusion die, comprising:
   first and second die body portions each associated with and having a single lip [,] and a main body and wherein one of the lips extends across a full width of the die body portion associated therewith and is moveable toward and away from the other lip about a hinge portion coupled to a main body and wherein the die body portions are joined such that a single die outlet is formed between and bounded by the lips; and
   moving means coupled to the one lip for moving the one lip across the full width of the die body portion including a lip adjustment block coupled to the one lip and moveable therewith and a sliding member engaged with the lip adjustment block and movable along a linear path to cause the lip adjustment block to move in a second path transverse to the linear path *and to cause movement of the one lip about the hinge portion.*

5. [The] *An* extrusion die [of claim 1], *comprising first and second die body portions each associated with and having a single lip and a main body and wherein one of the lips extends across a full width of the die body portion associated therewith and is moveable toward and away from the other lip about a hinge portion coupled to a main body and wherein the die body portions are joined such that a single die outlet is formed between and bounded by the lips; and*
   *moving means coupled to the one lip for moving the one lip across the full width of the die body portion including a lip adjustment block coupled to the one lip and moveable therewith and a sliding member engaged with the lip adjustment block and moveable along a linear path to cause the lip adjustment block to move in a second path transverse to the linear path;*
   wherein the one lip includes a flange and the lip adjustment block includes walls defining a groove at a marginal portion of the lip adjustment block and wherein the flange is disposed in the groove and is moveable with the lip adjustment block.

7. [The] *An* extrusion die [of claim 1], *comprising first and second die body portions each associated with and having a single lip and a main body and wherein one of the lips extends across a full width of the die body portion associated therewith and is moveable toward and away from the other lip about a hinge portion coupled to a main body and wherein the die body portions are joined such that a single die outlet is formed between and bounded by the lips; and*
   *moving means coupled to the one lip for moving the one lip across the full width of the die body portion including a lip adjustment block coupled to the one lip and moveable therewith and a sliding member engaged with the lip adjustment block and moveable along a linear path to cause the lip adjustment block to move in a second path transverse to the linear path;*
   wherein a threaded stud extends axially from the sliding member and a spool is disposed in threaded engagement with the threaded stud.

14. [The] *An* extrusion die [of claim 1], *comprising first and second die body portions each associated with and having a single lip and a main body and wherein one of the lips extends across a full width of the die body portion associated therewith and is moveable toward and away from the other lip about a hinge portion coupled to a main body and wherein the die body portions are joined such that a single die outlet is formed between and bounded by the lips; and*
   *moving means coupled to the one lip for moving the one lip across the full width of the die body portion including a lip adjustment block coupled to the one lip and moveable therewith and a sliding member engaged with the lip adjustment block and moveable along a linear path to cause the lip adjustment block to move in a second path transverse to the linear path;*
   wherein the sliding member includes at least one cam block and the lip adjustment block includes walls defining at least one recess sized to closely receive the cam block for sliding movement therein, and wherein the cam block engages the walls defining the recess.

17. An extrusion apparatus for extruding a single stream of thermoplastic material, comprising:
   first and second die body portions each of a particular width and including a main body, a single lip having a lip width extending across the entire particular width of an associated die body portion, and a hinge interconnecting the lip and the main body wherein the hinge permits movement of the lip relative to the main body and wherein the first and second die body portions are joined together to form a die outlet bounded on first and second sides by the lips of the first and second die body portions, respectively, whereby the single stream exits the apparatus through the die outlet in contact with the lips; and
   first means coupled to the lips of the first and second die body portions for moving the lips relative to one another to permit adjustment of the die outlet and thereby control the thickness of the single stream of the thermoplastic material;
   wherein the first moving means comprises lip adjustment apparatus coupled to [one of the lips] *the lip of the first die body portion and spanning the hinge of the first die body portion*, a sliding member disposed in sliding engagement with the lip adjustment apparatus, and second means for moving the sliding member along the width of the [one] lip *of the first die body portion* to move the lip adjustment apparatus and thereby [adjust] *pivot* the [position of the] entire [one lp] *lip of the first die body portion about the hinge of the first die body portion.*

18. [The] *An* extrusion apparatus [of claim 17.] *for extruding a single stream of thermoplastic material, comprising;* first and second die body portions each of a particular width and including a main body, a single lip having a lip width extending across the entire particular width of an associated die body portion, and a hinge interconnecting the lip and the main body wherein the hinge permits movement of the lip relative to the main body and wherein the first and second die body portions are joined together to form a die outlet bounded on first and second sides by *the* lips of the first and second die body portions, respectively, whereby the single stream exits the apparatus through the die outlet in contact with the lips; and first means coupled to the lips of the first and second die body portions for moving the lips relative to one another to permit adjustment of the die outlet and thereby control the thickness of the single stream of thermoplastic material;

wherein the first moving means comprises lip adjustment apparatus coupled to one of the lips, a sliding member disposed in sliding engagement with the lip adjustment apparatus and second means for moving the sliding member along the width of the one lip to move the lip adjustment apparatus and thereby adjust the position of the entire one lip;

wherein the second moving means includes a threaded stud extending axially from the sliding member and a complementarily threaded spool threaded engaging the threaded stud.

22. [The] *An* extrusion apparatus [of claim 17,] *for extruding a single stream of thermoplastic material, comprising;*

*first and second die body portions each of a particular width and including a main body, a single lip having a lip width extending across the entire particular width of an associated die body portion, and a hinge interconnecting the lip and the main body wherein the hinge permits movement of the lip relative to the main body and wherein the first and second die body portions are joined together to form a die outlet bounded on first and second sides by the lips of the first and second die body portions, respectively, whereby the single stream exits the apparatus through the die outlet in contact with the lips; and*

*first means coupled to the lips of the first and second die body portions for moving the lips relative to one another to permit adjustment of the die outlet and thereby control the thickness of the single stream of thermoplastic material;*

*wherein the first moving means comprises lip adjustment apparatus coupled to one of the lips, a sliding member disposed in sliding engagement with the lip adjustment apparatus and second means for moving the sliding member along the width of the one lip to move the lip adjustment apparatus and thereby adjustment the position of the entire one lip;* wherein the sliding member includes at least one cam block and the lip adjustment apparatus comprises a block including walls defining at least one recess sized to closely receive the cam block for sliding movement therein, and wherein the cam block engages the walls defining the recess.

23. The extrusion apparatus of claim 17, wherein the moving means further includes means coupled to the [other] lip *of the second die body portion* for moving [the other] *such* lip relative to the [one] lip *of the first die body portion* to permit further adjustment of the die outlet.

25. The extrusion apparatus of claim 24, wherein the second moving means includes a servomotor coupled between the computer control and the [one] lip *of the first die body portion.*

29. An extrusion die, comprising:

first and second die body portions each having a single lip and an associated main body and wherein one of the lips is moveable toward and away from the other lip about a hinge portion coupled to the main body associated with the one lip and wherein the die body portions are joined such that a die outlet is formed between and is coextensive with the lips; and means for automatically moving both lips to adjust the die outlet including a computer control responsive to a command and further including at least one member coupled to *the* [of the lips] *lip and spanning the hinge portion,* a sliding member engaged with the at least one member and adjustment apparatus operable to move the sliding member and the at least one member to *pivot the one lip about the hinge portion and thereby* adjust the position of the one lip along a full width thereof.

32. An extrusion die, comprising:

a pair of main body portions each including a single movable lip *coupled to a hinge portion* wherein the main body portions are joined together such that a single die exit is formed between the movable lips and wherein each lip has a width extending entirely across the die exit; and lip moving apparatus including at least one member coupled to one of the lips *and spanning the hinge portion coupled to the one lip,* a sliding member engaged with the at least one member and adjustment apparatus operable to move the sliding member and the at least one member to *pivot the one lip about the hinge portion coupled to the one lip and thereby* adjust the position of the one lip along a full width thereof, wherein the adjustment apparatus includes a rotatable member engaged with the sliding member and wherein, by rotating the rotatable member, the sliding member moves along a first direction and the at least one member moves along a second direction transverse to the first direction.

* * * * *